(12) United States Patent
Kleman

(10) Patent No.: US 6,765,524 B2
(45) Date of Patent: *Jul. 20, 2004

(54) METHOD AND DEVICE FOR LIQUID LEVEL MEASUREMENT

(75) Inventor: Mikael Kleman, Vreta Kloster (SE)

(73) Assignee: Saab Marine Electronics AB, Gothenburg (SE)

(*) Notice: Subject to any disclaimer, the term of this patent is extended or adjusted under 35 U.S.C. 154(b) by 0 days.

This patent is subject to a terminal disclaimer.

(21) Appl. No.: 10/061,355

(22) Filed: Feb. 4, 2002

(65) Prior Publication Data

US 2002/0135508 A1 Sep. 26, 2002

Related U.S. Application Data

(63) Continuation-in-part of application No. 09/576,544, filed on May 22, 2000, now Pat. No. 6,414,625.

(30) Foreign Application Priority Data

Jul. 2, 1999 (SE) .............................. 9902594

(51) Int. Cl.[7] ............................................. G01S 13/08
(52) U.S. Cl. ....................................................... 342/124
(58) Field of Search ....................... 342/124; 73/290 R; 340/618

(56) References Cited

U.S. PATENT DOCUMENTS

| 4,319,242 A | 3/1982 | Lewis |
| 4,665,403 A | 5/1987 | Edvardsson .................. 342/124 |
| 4,853,650 A | 8/1989 | Bowling et al. ............. 330/287 |
| 5,305,237 A | 4/1994 | Dalrymple et al. ......... 342/124 |
| 5,406,842 A | 4/1995 | Locke ......................... 342/124 |
| 5,504,490 A | 4/1996 | Brendle et al. ............. 342/124 |
| 6,242,984 B1 | 6/2001 | Stones et al. ............... 330/295 |
| 6,414,625 B1 * | 7/2002 | Kleman ...................... 342/124 |

FOREIGN PATENT DOCUMENTS

| WO | 90/09599 | 8/1990 | |
| WO | 01/02818 | 1/2001 | ........... G01S/13/08 |

* cited by examiner

Primary Examiner—Daniel T. Pihulic
(74) Attorney, Agent, or Firm—Westman, Champlin & Kelly, P.A.

(57) ABSTRACT

A liquid level measuring gauging system including a radar antenna, a plurality of functionally independent radar measuring channels, and a feeder operably connected with the channels and operable to feed microwave signals of the channels to the antenna.

28 Claims, 4 Drawing Sheets

METHOD AND DEVICE FOR LIQUID LEVEL MEASUREMENT

This a continuation in part of Application No. 09/576,544, filed May 22, 2000, now U.S. Pat. No. 6,414,625.

FIELD OF THE INVENTION

The present invention relates to methods and devices that employ electromagnetic radiation for measuring a level of a material in a receptacle. In particular, the present invention relates to a device for feeding microwave signals from different microwave channels to one antenna unit in a radar level gauging system. The invention further shows a method for achieving the feeding.

BACKGROUND OF THE INVENTION

It is known to measure the level of the surface of a medium stored in a tank utilizing a radar level gauge. Such a device is described in U.S. Pat. No. 4,665,403. When measuring the level of the medium in a tank, there are often requirements that the level must be supervised to fulfill security restrictions. Hence, as an example, one or two independent overfill alarms must be installed. The user further may want redundancy in measured values which may require more than one installed measurement system, which may require at least two complete independent level gauges.

The desire for independence in the measurement system can extend to independent electrical circuits and cabling. That is, the system can include circuits and cabling without any galvanic contact between different measuring systems. However, fixed mechanical constructions for example, which cannot normally go wrong, may be shared. Float sensors and different types of capacitive sensors, for example, mounted in separate tank bushings are often utilized as sensors for such alarm systems. However, these sensors can be sensitive to linings, corrosion and other influence from the content of the load tanks or their wiring and the risk of malfunction is therefore evident.

Published international patent publication PCT/SE00/01291 discloses a device and a method for measuring the level of the surface of a medium in a tank. The disclosed device utilizes more than one radar channel to obtain a measured value of the level, where the level values measured in the channels are obtained independently of each other. This is accomplished by utilizing at least two microwave signals distributed in separate channels fed to the same antenna unit, whereby the at least two signals are used to measure the level independently of each other. The microwave signals can be distinguished utilizing a detectable characteristic.

Security restrictions to fulfill safety and environmental laws and requirements may result in a need for each measurement of the surface level of the medium in the tank to be completely separated from each other. It is often necessary to use two or more independent measurement instruments in order to make it possible to have the measurements regarded as fail-safe.

SUMMARY OF THE INVENTION

The present invention provides a liquid level measuring gauging system. The system includes a radar antenna. The system also includes a plurality of functionally independent radar measuring channels. A feeder is operably connected with the channels and operable to feed microwave signals of the channels to the antenna.

Also, the present invention provides a liquid level measuring gauging system. The system includes a radar antenna. A first radar-measuring channel is connected to the radar antenna and includes a transmitter, a receiver and an indicating element. At least one further radar-measuring channel is connected to the radar antenna. The radar waves of the further radar measuring channel are distinguishable from the radar waves used in the first radar-measuring channel.

Additionally, the present invention provides a liquid level measuring gauging system. The system includes an antenna unit. A feeder is operable to feed at least two distinguishable microwave signals to the antenna unit. The feeder includes at least two waveguide members. Each waveguide member is operable to receive one of the microwave signals from a transmission line. A plurality of functionally independent channels are operable to distribute the microwave signals. A plurality of transmission lines are operable to forward the microwave signals of the channels to the waveguide members of the feeder. A common waveguide outlet for all waveguide members is arranged at a waveguide interconnection.

Furthermore, the present invention provides an antenna feeder that includes at least two waveguide members each operable to receive a microwave signal from a transmission line operable to forward the microwave signal from one of a plurality of functionally independent channels to the waveguide members. A common waveguide outlet for all waveguide members is arranged at a waveguide interconnection.

Still further, the present invention provides a method for measuring level in a receptacle. The method includes distributing a plurality of distinguishable electromagnetic signals in separate channels. Each signal is fed to a separate waveguide member. The signals are transmitted from each waveguide member to a common outlet.

Also, the present invention provides a method for measuring a level in a receptacle using radar. Electromagnetic waves are transmitted with radar measuring channels via a single aerial directed down into a receptacle. The waves are distinguishable by a detectable characteristic for each channel. A reflected time-delayed wave is received. A level is calculated from the time delay.

Additionally, the present invention provides a method in a level measuring gauging system for feeding at least two distinguishable microwave signals distributed in separated channels to the same antenna hardware. A waveguide member is provided for each microwave signal. Each microwave signal is forwarded to an associated waveguide member through a transmission line associated with the signal. The transmission line is galvanically isolated from the associated waveguide member. The signals are transmitted from each waveguide member via an outlet common for all waveguide members.

Still other objects and advantages of the present invention will become readily apparent by those skilled in the art from a review of the following detailed description. The detailed description shows and describes preferred embodiments of the present invention, simply by way of illustration of the best mode contemplated of carrying out the present invention. As will be realized, the present invention is capable of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood when considered in conjunction with the accompanying drawings, in which:

FIG. 4 represents a perspective partially exploded view of a portion of the embodiment shown in FIG. 3a;

DETAILED DESCRIPTION OF THE INVENTION

Figure 1:
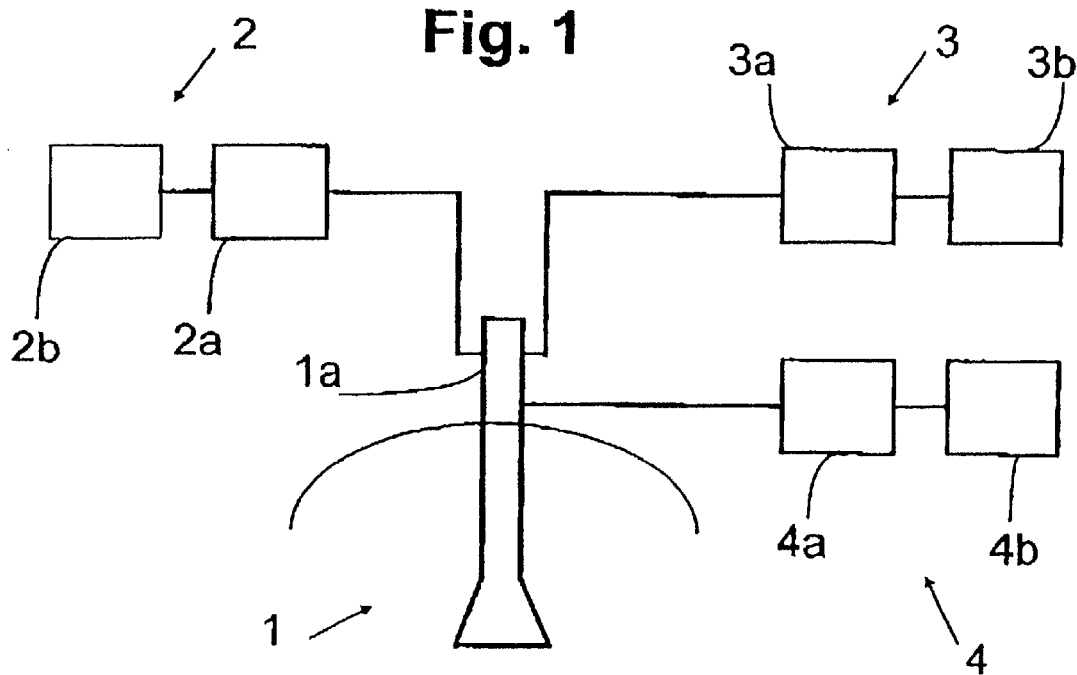
FIGS. 1 and 2 represent diagrams illustrating two different embodiments of a device according to the present invention for level measurement.

Advantages of the present invention can include that by utilizing a single aerial for two or more level measuring channels, costs are saved for further aerials and for fittings in the tank and tank bushing for the fittings. If two measuring channels are identical, redundant measuring results are obtained. If the two results lie within a certain tolerance range, this can provide evidence that the measuring channels are functioning. Several identical measuring channels can also make the stocking of spare parts easier and cheaper.

Additionally, the present invention provides a system that can include one radar channel for normal level measurement and another for an overflow alarm, and/or another for a high level alarm, among other functions. These channels share a single antenna and operate separately, in parallel, and in real time for fulfilling security requirements.

Another significant advantage of the present invention is that it can provide equipment for measuring the liquid level in a tank while only needing a single opening or aperture in the tank to accommodate the equipment. Advantages of minimizing the number of apertures in a tank include reduced cost and increased safety. Along these lines, forming additional apertures in a tank costs additional money, as do providing additional antennas. Also, the more openings that exist in a tank, the greater the number of places exist for material in a tank to potentially escape and cause harm.

The present invention provides a device that level measurement and/or alarm indication for an amount of material in a receptacle, such as a tanker's load tanks. Significantly, the present invention can be utilized for all types of liquids and bulk materials. One purpose of the present invention is to provide a failsafe system for level measurement and alarm utilizing a radar level gauge.

By use of the device and the method according to the present invention it is possible to arrange for the microwave signals distributed in separate radar measuring channels to be galvanically isolated from each other. Waveguides are electrically conducting. Thus, normally, when two or more microwave signals distributed in a coaxial line or cable to a waveguide, the waveguide will short-circuit the exterior conductors of the coaxial lines. As a result, the channel distributing a certain first microwave signal is not completely galvanically independent and separated from another channel distributing a second microwave signal. A "channel" as referred to herein is characterized as all the electronics, including microwave transmitter and receiver, that is needed to generate, transmit, distribute and receive the microwave signals up to the microwave waveguide. Typically, the microwave signals used in the inventions aspects are distinguishable. This may be arranged by generating microwave signals for the different channels to have, for example, different polarization, different modulation, different frequencies, time of occurrence, and/or other parameters.

An important task in use of two or more microwave signals originating from different microwave channels when using the same antenna hardware is to find a proper component, referred to herein as a combiner, that can receive the electrical signals, in this case the microwave signals, distributed to the component by some kind of transmission lines, such as coaxial cables, and to convert these signals to microwaves for distribution in a waveguide to the antenna. By use of the device and method according to the present invention this task is fulfilled. It is possible with the device according to the present invention to receive incoming microwave signals from different cables, to transfer the electrical signals into waves and to keep the channels delivering the separate microwave signals galvanically isolated from each other.

An important advantage of aspects of the present invention includes making it possible to use only one radar instrument installation for all measurements needed to have full control of the level of the surface of a medium in a tank. The radar instrument can be provided with two or more microwave channels, distributing microwave signals to a combiner and delivering microwaves to a single antenna hardware. The channels may be made galvanically independent and it is possible to make them galvanically separated from each other. As a result, it will thus be possible to fulfill various authority requirements for fail safe measurements. This, in turn means that redundant measurement devices will be superfluous and separately installed overfill alarms are not necessary.

By using essentially the same antenna hardware for two or more antenna functions there is a need for only one opening in the roof, at least for level measuring purposes, and still have independent measuring function in two or more channels. Using one hardware containing two or more antenna functions does not exclude the possibility of measuring level using more than two channels, as the antenna hardware is a mechanical device and out of all practical reasons failsafe. Any deterioration of the antenna function, by for example contamination on the antenna from the medium in the tank, will be detected by the instrument and cause an alarm condition.

The term galvanically is utilized herein according to its common interpretation. Accordingly, two objects indicated to be galvanically isolated from each other are separated in DC terms.

FIG. 1 schematically illustrates an embodiment of a device according to the present invention. The device includes an aerial or antenna 1. The aerial can be a fixed or movable parabolic, conical, transmission line or straight tube aerial. A radar-measuring channel is connected to the aerial 1. The measuring channel 2 includes a transmitter/receiver 2a and an indicating device 2b designed to indicate the current level and generate an alarm at a predetermined level. According to the present invention at least one further radar-measuring channel is connected to the aerial 1. The embodiment shown in FIG. 1 includes two additional measuring channels 3 and 4. Each additional radar measuring channel includes a transmitter/receiver 3a and 4a, respectively, and an indicating device 3b and 4b, respectively. Waves produced by the antenna are directed toward and reflected by a medium to be measured. To prevent radar waves transmitted by a transmitter, for example in measuring channel 2, and reflected by the medium being measured from being received by the receivers in measuring channels 3 or 4, the radar waves from each channel are distinguishable by a detectable characteristic for each wave. A number of characteristics could be utilized. For example, timing, polarization and/or modulation of waves could be utilized to differentiate among the waves.

It will be appreciated that several different measuring and alarm alternatives can be provided using one or more additional measuring channels. For example, a measurement can be carried out using one extra radar-measuring channel 3. The measurement carried out by channel 3 could be redundant to a level measurement carried out using measuring channel 2. If the measuring values from both measuring channels lie within predetermined tolerance values, it could be verified with a very high degree of probability that the level value measured is correct. Alternatively, a high level alarm can be obtained with the extra measuring channel 3 in the form of an alarm at a maximum permitted level or an overfill alarm.

Utilizing additional measuring channels, which in the embodiment shown in FIG. 1 include measuring channels 3 and 4, it may be possible to simultaneously execute both a redundancy measurement and produce a high level alarm. Alternatively, a level measurement can be executed using measuring channel 2, a high level alarm obtained with measuring channel 3 and an overfill alarm with measuring channel 4. With a plurality of measuring channels, any desired functions could be carried out.

Figure 2:
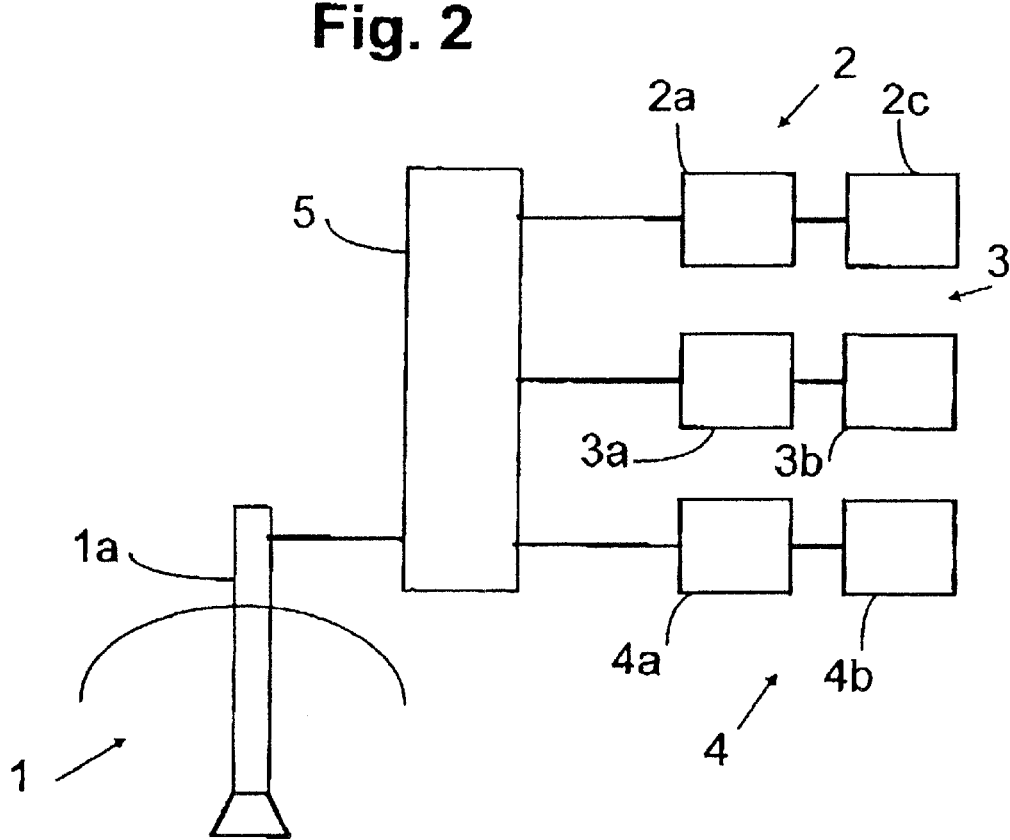

FIG. 2 schematically shows an alternative embodiment of the present invention. The embodiments shown in FIGS. 1 and 2 differ with regard to how the measuring channels 2, 3 and 4 are connected to the aerial 1. In particular, in the embodiment shown in FIG. 1, the measuring channels are connected to a supply lead 1a to the aerial. In the alternative embodiment shown in FIG. 2, the measuring channels 2, 3 and 4 are connected to the supply lead 1 a via a power divider 5. Such a power divider is known to those skilled in the art.

Figure 3A:
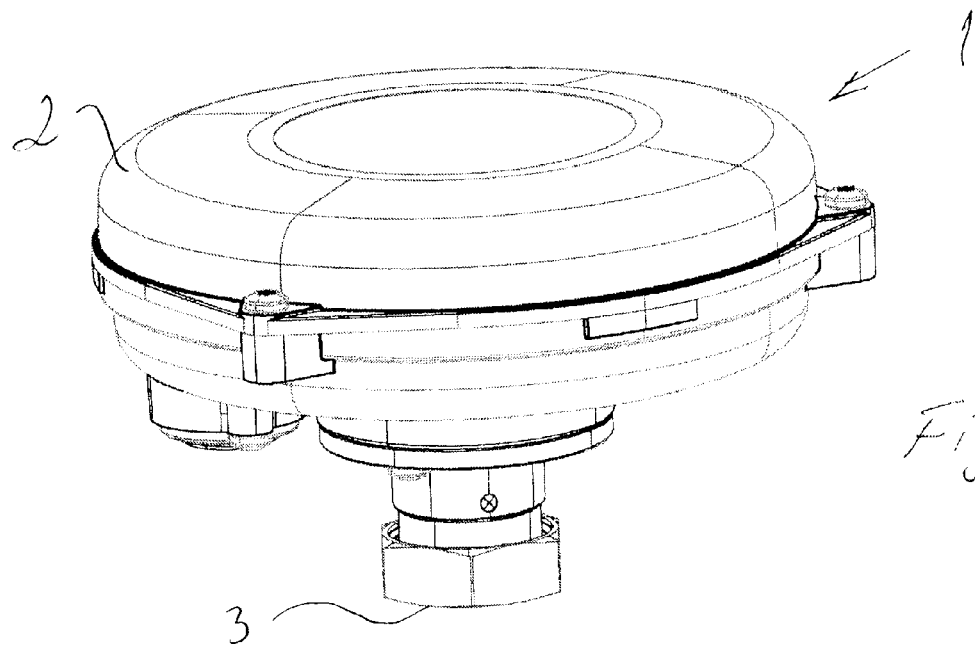
FIG. 3a represents a perspective view of another embodiment of a level measurement instrument according to the present invention.

While FIGS. 1 and 2 schematically illustrate embodiments of the present invention, FIGS. 3a-6 illustrate in greater detail concrete embodiments of the present invention as well as aspects not shown in the schematic illustrations shown in FIGS. 1 and 2. Along these lines, FIG. 3a illustrates an embodiment of a housing 2 of a complete radar level-measuring gauge 1 according to the present invention. The housing can be made of a variety of materials. For example, the housing could be made of metal, metal alloy, plastic, carbon fiber and/or another appropriate material for a housing.

Figure 3B:
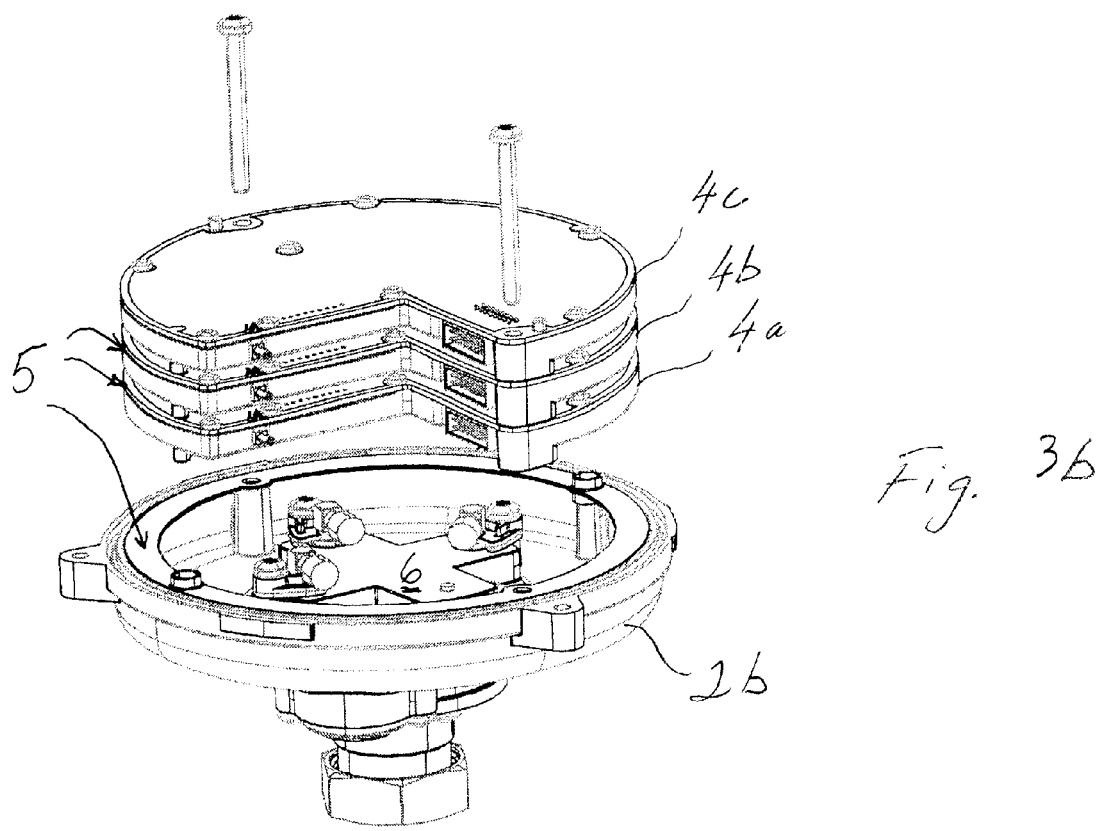
FIG. 3b represents a perspective partially exploded view of a portion of the embodiment shown in FIG. 3a including an embodiment of a combiner according to the present invention.

FIG. 3b shows the embodiment depicted in FIG. 3a with the top part of the housing removed, leaving only the housing bottom part 2b visible. FIG. 3b illustrates in greater detail elements of the present invention that permit a single antenna to be utilized with multiple measuring channels. Microwave radiation generated by the transmitters of the radar channels in the gauge is output through the waveguide output 3.

The embodiment shown in FIG. 3b includes three measuring channels. Along these lines, the interior of the housing FIG. 3b illustrates the electronic circuit boards for three different radar level measuring channels 4a, 4b, 4c mounted on top of each other. Typically, these circuit boards are electrically, or galvanically, separated and isolated from each other. Any suitable means may be utilized to effect the electrical isolation. For example, the electrical isolation in the embodiment shown in FIG. 3b is created with electrical isolation sheets 5 embedded between each radar channel circuit board 4a, 4b, 4c and between the lowest circuit board 4a and the housing 2. The isolation sheets may be omitted. According to such an embodiment, the boards will still be isolated from each other. However, the isolation rendered by a physical separation between adjacent circuit boards, with the material of the boards being sufficiently electrically insulating in itself.

To facilitate use of multiple measuring channels, the present invention may include elements to feed and receive signals from the measuring channels. Along these lines, the embodiment illustrated in FIG. 3b includes three radar channels and a combiner for feeding an antenna. Inside the embodiment of the housing bottom part 2b shown in FIG. 3b, an embodiment of a combiner 6 is arranged. The combiner 6 is located at the bottom of the housing and is operable to receive microwave signals from radar channels 4a, 4b, and 4c. The combiner is also operable to output the microwave signals as waves through an antenna feeding waveguide 7, by which the antenna (not shown) is fed.

Figure 4:
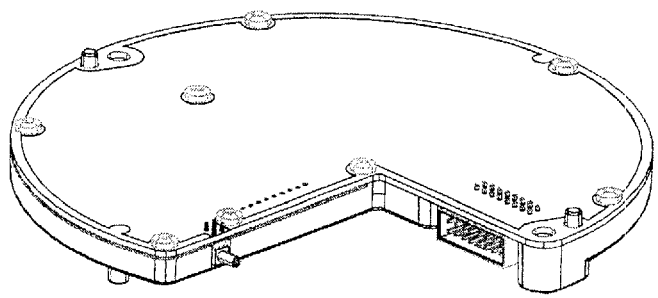
Figure 4:
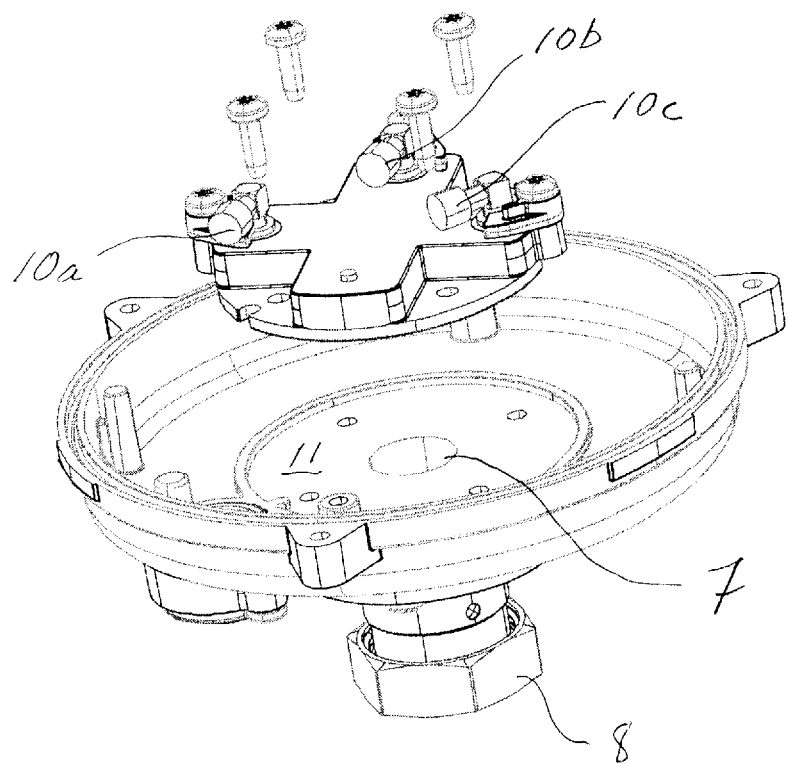

FIG. 4 illustrates the electronics associated with one of the radar channels, an embodiment of the combiner, and the bottom part of a housing in an exploded view. The housing and elements located therein may be attached to an antenna utilizing a fastener 8. Any suitable type of antenna may be utilized. One example of an antenna is a horn antenna.

The embodiment of the combiner 6 shown in FIG. 4 has three connections for three different radar channels. The connections are shown as coaxial connectors 10a, 10b, and 10c. Each connector may be mounted on a waveguide member 6a, 6b, and 6c. Each waveguide member has an opening to one side and is united with the other waveguide members at this one side, such that the waveguide members 6a, 6b, and 6c have a common outlet. Signals exit the combiner and are fed to the antenna through antenna feeding waveguide 7. The side of each waveguide member channel opposite the opening is closed.

The embodiment of the combiner shown in FIG. 4 is designed for mounting on a flat surface 11 at the bottom of the housing 2. The flat surface 11 forms a fourth wall of each waveguide member channel. The combiner may include a fourth wall for each waveguide channel or a common wall rather than having the fourth wall provided by the housing.

Figure 6:
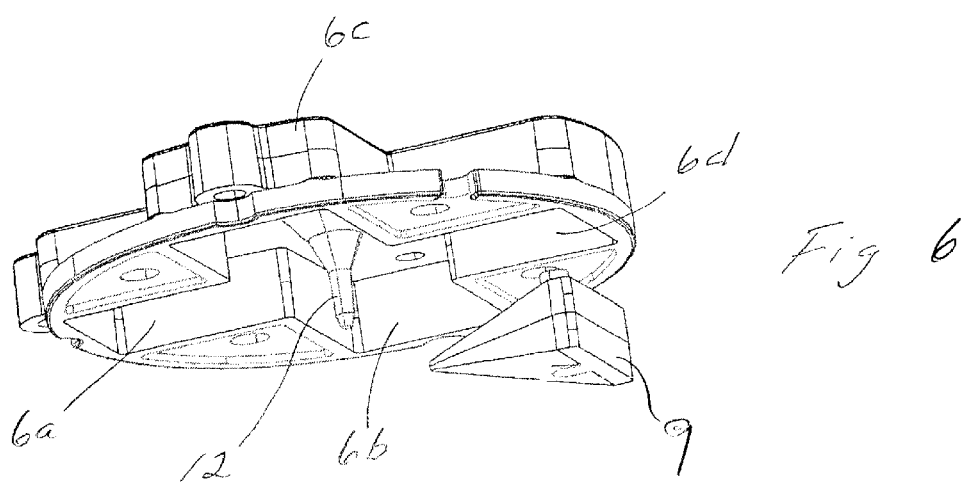
FIG. 6 represents a perspective view of the embodiment of the combiner shown in FIG. 5 from another angle.

FIG. 6 illustrates the interior of the embodiment of the waveguide members shown in FIGS. 3b and 4. The four waveguide members 6a, 6b, 6c, and 6d shown in FIG. 6 all have a rectangular cross-section. All four waveguide members open into a common space. In the center of the common space is arranged a cone 12 for impedance matching between the waveguide members 6a, 6b, 6c, and 6d and for achieving the desired characteristic insulation properties.

In the embodiment shown in FIGS. 3a, 3b, and 4–6, the fourth waveguide member 6d is not used. It is filled with a suitably shaped waveguide terminator 9 of a microwave absorbing material. FIG. 4 illustrates that in this embodiment the waveguide members each have three walls in the dismountable part of the combiner 6, in other words, the portion of the combiner that is attached to the housing bottom. The fourth wall of each rectangular waveguide member is added when the combiner 6 is mounted and fixed against the flat surface 11.

Figure 5:
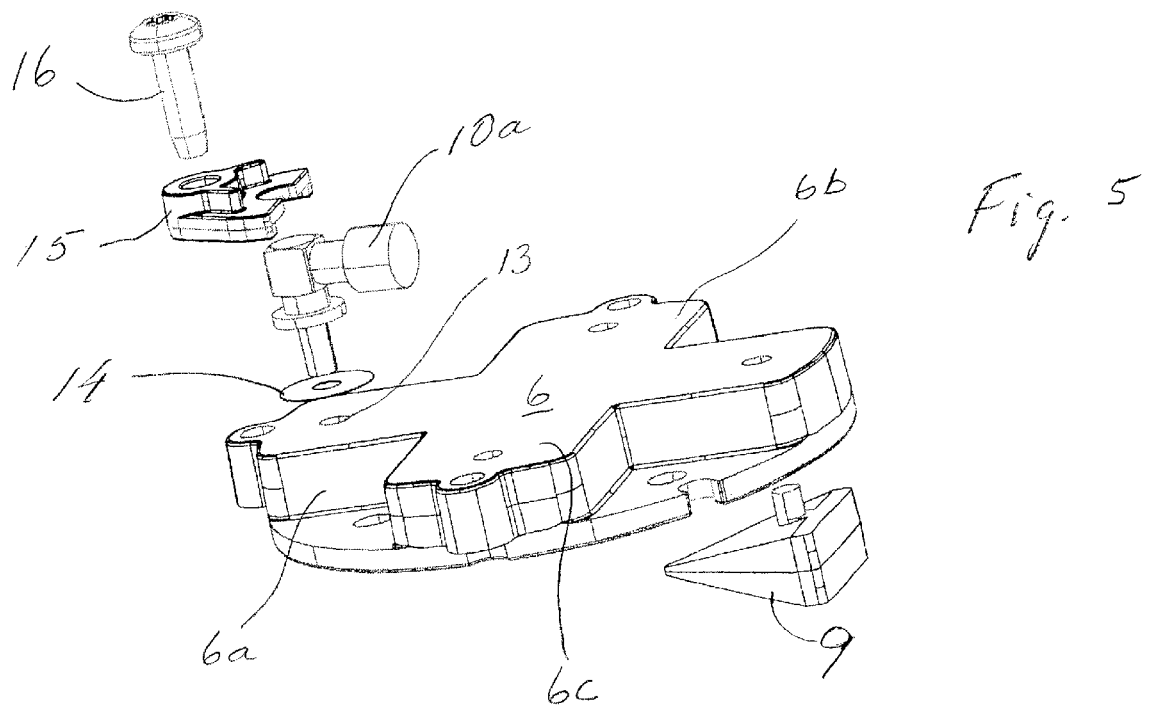
FIG. 5 represents a perspective view of an embodiment of a combiner according to the present invention.

Microwave signals may be provided to the combiner 6 with probes. FIG. 5 illustrates an embodiment of a probe that may be employed. The embodiment of the probe shown in FIG. 5 includes a coaxial connector 10a. In the embodiment shown in FIGS. 3a, 3b and 4–6, each channel includes such a connector.

The connector forwards the microwave signal from one of the radar channels and introduces the signal into the combiner 6 at waveguide member 6a by means of a center cable signal part of the connector 10a. The center part of the connector is introduced into the waveguide member 6a through opening 13 in the waveguide member. As a result, the microwave may be transferred to waveform inside the waveguide 6a.

The coaxial cable providing the signal to the connector 10a may include a shield. The coaxial cable may act as a so-called signal ground. The present invention may include one or more elements to provide an electrical insulation between the signal ground and the casting of the combiner 6. This electrical insulation may be provided by use of an electrically insulating washer 14. The washer 14 may be made of any suitable electrically insulating material. One example of such a material is mica.

Since the connector 10a is electrically insulated from the casting and thus can not be fastened directly to the casting, the connector may be secured in place by means of a clamp device 15. The embodiment of a clamp device shown in FIG. 5 is made of an electrical insulating material, such as a plastic material. The clamp may be fixed to the combiner 6 by means of a fastening device 16, such as a screw, a rivet or an equivalence. The embodiment of the clamp 15 shown in FIG. 5 embraces a socket of the connector, whereby the connector is held firmly in place. The connection of the other radar channel microwave signals to the combiner 6 may be made as described above.

As can be deduced by those skilled in the art, parts of the invention can be made in different ways and still fulfill the same function. For example, the combiner of the type described above can be substituted by any other microwave hybrid component having similar function and especially insulation properties between some of the microwave channels. Another way that the invention could be modified could include making the coaxial cables of other standard microwave transmission lines, such as printed coplanar waveguides. Corresponding alternative ways to apply the galvanic isolation exist. These represent just a few of the modifications that could be made.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

I claim:

1. A liquid level measuring gauging system, comprising:
   a radar antenna;
   a plurality of functionally independent radar measuring channels; and
   a feeder operably connected with the channels and operable to feed microwave signals of the channels to the antenna.

2. The system according to claim 1, wherein the feeder comprises a waveguide member for each channel.

3. The system according to claim 2, further comprising:
   a plurality of transmission lines operable to feed microwave signals of the channels to the waveguide members of the feeder.

4. The system according to claim 3, wherein the transmission lines are galvanically isolated from the waveguide members.

5. The system according to claim 3, further comprising:
   an electrically insulating washer for galvanically isolating the transmission lines from the waveguide members.

6. The system according to claim 2, further comprising:
   microwave signal insulation between at least two of the waveguide members.

7. The system according to claim 2, wherein at least adjacent waveguide members are arranged orthogonally with respect to each other.

8. The system according to claim 1, further comprising:
   a common waveguide outlet for all waveguide members, the common waveguide outlet being arranged at a waveguide interconnection.

9. The system according to claim 1, wherein the microwave signals are indistinguishable from each other.

10. The system according to claim 1, wherein the microwave signals are distinguishable from each other.

11. The system according to claim 1, comprising three channels.

12. The system according to claim 1, wherein one of the channels measures a maximum permitted level and one of the channels measures a level.

13. The system according to claim 12, wherein more than one channel measures a maximum permitted level.

14. The system according to claim 12, wherein more than one channel measures a level.

15. The system according to claim 1, wherein the channels are galvanically isolated from each other.

16. The system according to claim 1, further comprising:
   coaxial connectors for connecting the channels to the feeder.

17. The system according to claim 1, wherein the radar antenna, radar measuring channels, and feeder are arranged in one aperture in a liquid holding tank.

18. A liquid level measuring gauging system, comprising:
   a radar antenna;
   a first radar measuring channel connected to the radar antenna and comprising a transmitter, a receiver and an indicating element; and
   at least one further radar-measuring channel connected to the radar antenna, the radar waves of the further radar-measuring channel being distinguishable from the radar waves used in the first radar-measuring channel.

19. A liquid level measuring gauging system, comprising:
   an antenna unit;
   a feeder operable to feed at least two distinguishable microwave signals to the antenna unit, the feeder comprising at least two waveguide members, each waveguide member operable to receive one of the microwave signals of a transmission line;

a plurality of functionally independent channels operable to distribute the microwave signals;

a plurality of transmission lines operable to forward the microwave signals of the channels to the waveguide members of the feeder; and a common waveguide outlet for all waveguide members, the common waveguide outlet being arranged at a waveguide interconnection.

20. An antenna feeder, comprising:

at least two waveguide members each operable to receive a microwave signal from a transmission line operable to forward the microwave signal of one of a plurality of functionally independent channels to the waveguide members; and a common waveguide outlet for all waveguide members, the common waveguide outlet being arranged at a waveguide interconnection.

21. A method for measuring level in a receptacle, the method comprising:

distributing a plurality of distinguishable electromagnetic signals in separate channels;

feeding each signal to a separate waveguide member; and transmitting the signals from each waveguide member to a common outlet.

22. A method for measuring a level in a receptacle using radar, the method comprising:

transmitting electromagnetic waves with radar measuring channels via a single aerial directed down into a receptacle, the waves being distinguishable by a detectable characteristic for each channel;

receiving a reflected time-delayed wave; and calculating a level from the time delay.

23. The method according to claim 22, wherein the waves are distinguishable time-wise.

24. The method according to claim 22, wherein the waves are distinguishable by at least one of modulation and polarization.

25. The method according to claim 22, wherein the waves are used to execute redundant level measurements.

26. The method according to claim 22, wherein a level measurement is executed with one wave that produces a high level alarm.

27. A method in a level measuring gauging system for feeding at least two distinguishable microwave signals distributed in separated channels to a single antenna hardware, the method comprising:

providing a waveguide member for each microwave signal;

forwarding each microwave signal to an associated waveguide member through a transmission line associated with the signal;

galvanically isolating the transmission line from the associated waveguide member; and transmitting the signals from each waveguide member via an outlet common for all waveguide members.

28. The method according to claim 27, further comprising:

galvanically isolating the channels from each other.

* * * * *

UNITED STATES PATENT AND TRADEMARK OFFICE
CERTIFICATE OF CORRECTION

PATENT NO. : 6,765,524 B2 Page 1 of 1
DATED : July 20, 2004
INVENTOR(S) : Mikael Kleman It is certified that error appears in the above-identified patent and that said Letters Patent is hereby corrected as shown below:

<u>Title page,</u>
Item [75], Inventor, please add:
-- Jan Westerling, Vreta Kloster (SE) --

Signed and Sealed this

Second Day of August, 2005

JON W. DUDAS
*Director of the United States Patent and Trademark Office*